United States Patent
Zabetian

(10) Patent No.: US 6,327,656 B2
(45) Date of Patent: *Dec. 4, 2001

(54) APPARATUS AND METHOD FOR ELECTRONIC DOCUMENT CERTIFICATION AND VERIFICATION

(75) Inventor: Mahboud Zabetian, Walnut Creek, CA (US)

(73) Assignee: Timestamp.com, Inc., Walnut Creek, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/886,874

(22) Filed: Jul. 2, 1997

(51) Int. Cl.[7] ................................................. H04L 9/00

(52) U.S. Cl. ..................... 713/176; 713/179; 713/150; 713/168; 713/169; 380/260; 380/285; 705/75; 705/76

(58) Field of Search ................................ 380/23, 25, 49, 380/30, 4, 260, 285, 28; 705/75, 76; 713/150, 168, 169, 179, 155, 161, 176, 177

(56) References Cited

U.S. PATENT DOCUMENTS

| | | | |
|---|---|---|---|
| Re. 34,954 | * 5/1995 | Haber et al. | 380/49 |
| 5,136,646 | 8/1992 | Haber et al. | 380/49 |
| 5,136,647 | 8/1992 | Haber et al. | 380/49 |
| 5,189,700 | 2/1993 | Blandford | 380/23 |
| 5,339,361 | 8/1994 | Schwalm et al. | 380/23 |
| 5,373,561 | 12/1994 | Haber et al. | 380/49 |
| 5,377,270 | 12/1994 | Koopman, Jr. et al. | 380/25 |
| 5,615,268 | 3/1997 | Bisbee et al. | 380/25 |
| 5,629,982 | * 5/1997 | Micali | 380/30 |

OTHER PUBLICATIONS

"What is Record Authentication," http://www.surety.com/whatis.html Surety Digital Notary Service.*
Timestamp.com, "Timestamp is Not," http://www.timestamp.com/, 1995.*
Richardson, M., "PGP Digital Timestamping Service", I.T. Consultancy Limited, Jersey, Channel Islands, Nov. 17, 1997 (http:\\www.itconsult.co.uk\).

* cited by examiner

Primary Examiner—Phung M. Chung
Assistant Examiner—Paul E. Callahan
(74) Attorney, Agent, or Firm—Fenwick & West LLP

(57) ABSTRACT

The certification of electronic documents for subsequent verification and authentication is disclosed. Pursuant to a request to certify a document, a digital signature is extracted from the document. The digital signature corresponds to the content of the document and is unique to the document. Thus, signatures extracted from documents that are even slightly different from the certified document, or from a document that has been changed, will be different. A certification provider maintains the digital certification signature, an identification code such as a serial number, and other information such as the time and date of certification. The serial number is returned to the certification requester. When verification is sought, the serial number and the document alleged to have been certified are given to the certification provider. The serial number is used to index the previously extracted digital certification signature. The same extraction process is used to extract a signature from the document alleged to have been certified. Then the digital signatures are compared. A match indicates that the alleged document and the previously certified one are the same, and a mismatch indicates the opposite. The certification can be used to provide an electronic timestamp for a document, thus providing proof of possession of the document at the time of certification. It can also be used in conjunction with an electronic mail transmission to a third party recipient, thus providing certified electronic mail.

20 Claims, 6 Drawing Sheets

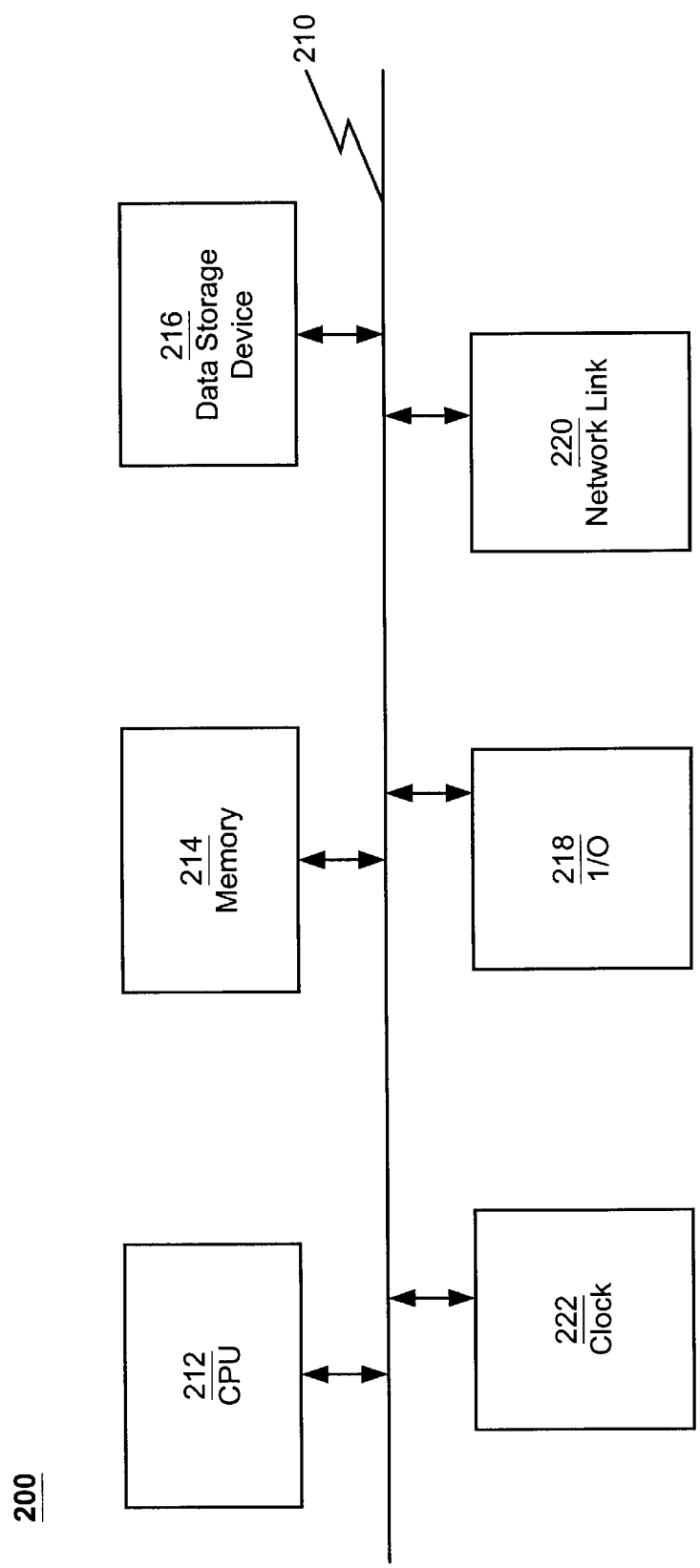

APPARATUS AND METHOD FOR ELECTRONIC DOCUMENT CERTIFICATION AND VERIFICATION

BACKGROUND OF THE INVENTION

1. Field of the Invention

The present invention relates generally to certifying electronic documents and more particularly to time-stamping and verifying time-stamps for documents transmitted using network resources.

2. Description of the Related Art

Various ways for certifying documents have been used throughout the ages. For example, a Notary public is a person empowered to witness and certify documents and to take oaths and affidavits. Typically, notarization relies upon the presence of parties and sometimes documents (in paper form) during certification, and the notary relies upon personal observation. Another type of certification is mail delivery certification. Typically, the recipient of a piece of mail signs and dates a document indicating that they have received it (or at least that they have received something from someone on a particular day).

Traditional document certification remains inadequate. For one, there remains a need for document certification without the need of a notary. One reason for this is that notarization can be very inconvenient—a notary public is not always on hand, and may not be available at all when needed. This is one reason that many important and time sensitive documents do not get notarized. For example, parties with documents pertaining to the conception of a patentable invention, a story line for a movie that was discussed with film companies, or an employment harassment complaint, could all benefit from a simple way of certifying and authenticating their documents, and, more particularly, a way of certifying that a particular document was in their possession or was transmitted by them at a given date and time.

In addition to the availability and convenience problem, the traditional methods of document certification can often provide inadequate results. One instance of this is the difficulty in determining whether an item that was ostensibly "certified" is the item that a party later asserts it to be. For example, a party may send a message using certified postal mail, and may receive a signed card indicating that the recipient had received something. However, the postal certification card may only prove that the recipient got something, and does not prove message content. Additionally, a page of a document may be notarized (such as a signature page), but an opposing party may later allege that other pages in the document were not present at the time of notarization, or that other pages in the document had been changed.

Thus, there remains a need for better and more convenient document certification, for certification and corresponding verification with time-stamp information, and for transmitting messages with convenient, content proving certification.

SUMMARY OF THE INVENTION

In accordance with the present invention, electronic document certification, verification of such certification, and certification in the transmission of electronic mail are provided.

According to one aspect of the present invention, a party with an electronic document can make a request for electronic document certification. The certification can, for example, be provided by an Internet server. The certification provider receives the party's request for certification, along with the electronic document to be certified. To perform certification, a unique digital signature is extracted from the electronic document. The extracted signature provides a document "fingerprint" that serves to identify the document and to distinguish the document from other documents, even ones that appear to be similar to one another. The certification provider also stores and maintains certification information including the unique digital signature for the document in association with an identification code. The certification information can also include additional information, such as an indication of the exact time and date of certification. The identification code (and optionally a copy of the certified document) can be provided to the party making the request for certification, or to any relevant party.

According to another aspect of the present invention, a document can be verified to determine whether it was previously certified and to determine whether the contents of the document are the same as that which was certified. This can provide not only an indication that a document was certified, including the date and time that the certification took place, but can also provide proof that the contents of the document in question correspond exactly to the certified material. This verification aspect can be undertaken by receiving a verification request that includes a document to be verified (one alleged to have been previously certified) along with an identification code. The certification provider can then locate, from its maintained certification information, the previously produced digital signature (if any) that corresponds to the offered identification code. Then, the certification provider can process the document to be verified to extract a digital verification signature (typically using the same protocol used in the certification process), and compare the verification signature to the previously produced digital signature to determine whether they match. If they match, then the document is certified, and a message can be transmitted to the verification requester indicating that the document is authentic and that it was certified at the relevant date and time.

According to another aspect of the present invention, the certification provider is a system that can receive and transmit electronic mail, and also can perform operations on received mail. This allows convenient communication between the certification requester and the certification provider. Furthermore, the certification provider provides certification of electronic mail messages transmitted by a sender to a recipient. The request for the transmission of certified electronic mail (from a certified electronic mail sender to a recipient), including the document to be certified, is received by the certification provider. The provider determines the recipient of the message, and also locates the document to be certified, extracts the digital signature, produces an identification code, and associates the identification code and the digital signature. The message is transmitted to the recipient, possibly including a note indicating that the message is being transmitted using certified electronic mail from the sender. Electronic mail can also be used to transmit the identification code and any other desired information corresponding to the certification requester (sender). Optionally, the certification provider can positively verify that the electronic mail was transmitted to the recipient, or wait a predetermined amount of time for a notice of non-delivery, prior to transmitting a confirmation to the certification requester. Verification would also be available using electronic mail communication. The certified document (such as the message itself) and the corresponding identification code are received by the certification provider using electronic mail. The maintained certification information is used to obtain the digital certification signature (from prior certification) associated with the identification code. Then a digital signature is extracted from the document alleged to have been previously certified (the verification signature), and the verification signature is compared to the certification signature to determine whether they match. Matching signatures indicates positive verification of prior certification. Results can be sent by electronic mail to the verification requester.

BRIEF DESCRIPTION OF THE DRAWINGS

These and other more detailed and specific features of the present invention are more fully disclosed in the following specification, reference being had to the accompanying drawings, in which:

FIG. 2A is a block diagram illustrating an embodiment of a certification provider in accordance with the present invention.

DETAILED DESCRIPTION OF THE INVENTION

Figure 1:
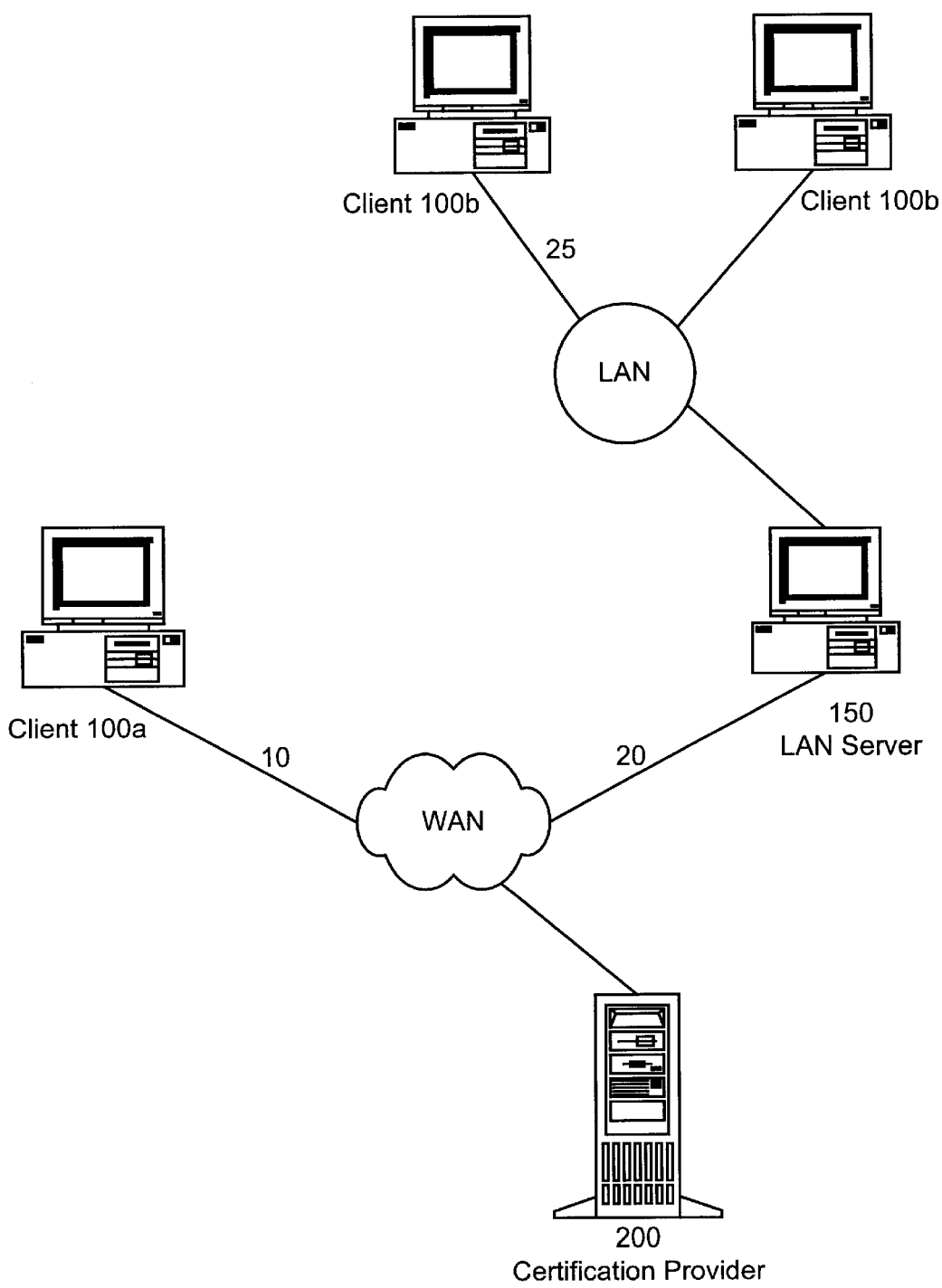
FIG. 1 is a schematic illustrating exemplary interconnections between a client and a wide area network server in accordance with the present invention.

Referring now to the schematic diagram of FIG. 1, the electronic document certification application and method of certification of the present invention preferably operate on a system wherein a client-server relationship can be established between a certification provider 200 (the server) and any one of a plurality of clients 100. The certification provider 200 is a server that includes the apparatus and uses the method of electronic document certification and verification in accordance with the present invention. In the system illustrated in FIG. 1, the certification provider 200 resides on a wide area network (WAN) such as the network typically referred to as the Internet or World Wide Web. Various exemplary interconnections are shown between clients 100 and the certification provider 200.

One way that the client-server relationship is established is shown in connection with client 100a. That client 100a is coupled to the WAN via a line 10 such as a telephone line. In this example, particularly where the WAN is the Internet, access can be provided by an Internet access provider or an Internet service provider and the client 100a includes a modem coupled to a telephone line to link to the service or access provider. Another way that the client-server relationship is established is shown in connection with client 100b. That client 100b is part of a local area network (LAN) and communication between the client 100b and the certification provider 200 can be facilitated by a connection 20 established through a LAN server 150. Although access can also be through an access or service provider, the connection 20 can be by other conventional means such as a leased line.

Although the preferred embodiment of the present invention contemplates that the certification provider 200 is an Internet server, the ordinarily skilled artisan will recognize the various alternatives for establishing a client-server connection between the certification provider 200 and a client 100, such as interconnection within a local area network of computers or over any internetwork connection of computers. Additionally, although the electronic document certification application is shown to reside at a server, it is understood that any computer can be used, and that access to the application can be provided in ways other than through the preferred client-server arrangement. For example, a document on a floppy disk can be certified by inserting the floppy disk into the relevant port of a personal computer including the electronic document certification application, which could return relevant certification information to the floppy disk. In such an instance, the certification provider can reside at the personal computer, and the client server relationship is not required The artisan will recognize the various alternatives for providing certification according to the principles of the present invention.

Preferably, the certification provider 200 uses a UNIX operating system, although any conventional operating system such as Windows NT could be used. The certification provider 200 also implements conventional internet communication protocols such as the transmission control protocol/internet protocol (TCP/IP) suite. Additionally, although a preferred embodiment uses the conventional simple mail transfer protocol (SMTP), the certification provider 200, in conjunction with the use of the electronic document certification application, can implement other communication protocols such as the file transfer protocol (FTP) and/or the Hypertext Transfer Protocol (HTTP) for the transfer of files or other information between the client 100 and the provider 200. Additionally, although functions for certification and verification can be provided at the certification provider 200, functions can also be undertaken by providing executable code to the client 100 (such as by implementing Java applets or ActiveX objects that are transmitted from server to client).

Although a more detailed embodiment of electronic document certification and verification is described with reference to the block diagram of FIG. 2B and flow charts of FIGS. 3–5 below, the interaction between the client 100 and certification provider (server) 200 are basically as follows. After communication between the certification provider 200 and a client 100 are established according to network protocols, the certification provider 200 operates to receive a request, from a user at the client 100 side, to certify an electronic document. The document will typically be included in the request.

After receipt of an appropriate certification request (registration can be checked, if applicable), the certification provider 200 processes the document to extract a unique digital signature from it. In one embodiment, a checksum is extracted from the document. The checksum is provided to provide adequate assurance that different documents, no matter how slightly different, will not generate the same checksum. Preferably, the checksum is 2 to 64 bytes or more depending on the typical document.

The certification provider 200 also maintains certification information. For example, the digital signature is stored or maintained, and an identification code is associated to the digital signature. Preferably, the date and time of certification are also included in the certification information. In the basic mode of certification, the identification code is transmitted to the party making the request for certification.

Provision of the identification code to the certification requester allows subsequent verification as follows. Assume that a client 100 user later wants to verify that a document in question was previously certified. The client 100 would request verification and provide, again using network signal transmission protocols, the identification code and the document in question to the certification provider 200. The certification provider 200 receives the request for verification, and first determines the identification code. The certification provider 200 then determines whether the identification code exists in its maintained certification information, and, if so, locates the digital signature that is associated with the code. Then, preferably using the same process used for certification, the certification provider 200 extracts a digital signature from the document to be verified. If the newly extracted digital signature matches the digital signature from certification, a positive verification that the document is the one that had been certified is established. The positive verification result is transmitted to the verification requester.

Referring now to the block diagram of FIG. 2A, an embodiment of a WAN certification provider 200 including an electronic document certification application is illustrated. The certification provider 200 comprises a central processing unit (CPU) 212, memory 214, data storage device 216, I/O ports 218, a network link 220, and a clock 222. The CPU 212 is a conventional processor such as a Pentium Pro as provided by Intel Corporation, Santa Clara, Calif., the data storage device 216 is a conventional storage device such as a hard disk, the I/O ports 218 provide conventional local data input and output. A bus 210 couples the CPU 212, memory 214, data storage device 216, I/O 218 and network line 220 in conventional fashion. The network link 220 is a conventional network interface to a network transmission line 230, and provides data to and from the server 230.

Preferably, the memory 214 includes a UNIX operating system, and is configured to transmit and receive information using the Simple Mail Transfer Protocol (SMTP). It is understood that other operating systems and other communication protocols, such as FTP and HTTP, can also be provided. The memory 214 is also configured to include the electronic document certification application. The CPU 212, at the direction of instructions provided in memory 214 so configured, and in conjunction with the various server modules 214, 216, 218, 220, and 222 operates to receive requests for electronic document certification; determine whether requests are properly registered; extract digital signatures from electronic documents; maintain certification information including extracted signatures and identification codes corresponding to them; and transmit certification information, such as identification codes, to parties pursuant to a certification requester. Similarly, verification of prior alleged certification is provided by receiving identification codes, extracting verification signatures from tested documents, and comparing digital signatures from certification to the verification signatures to determine whether they match.

Figure 2B:
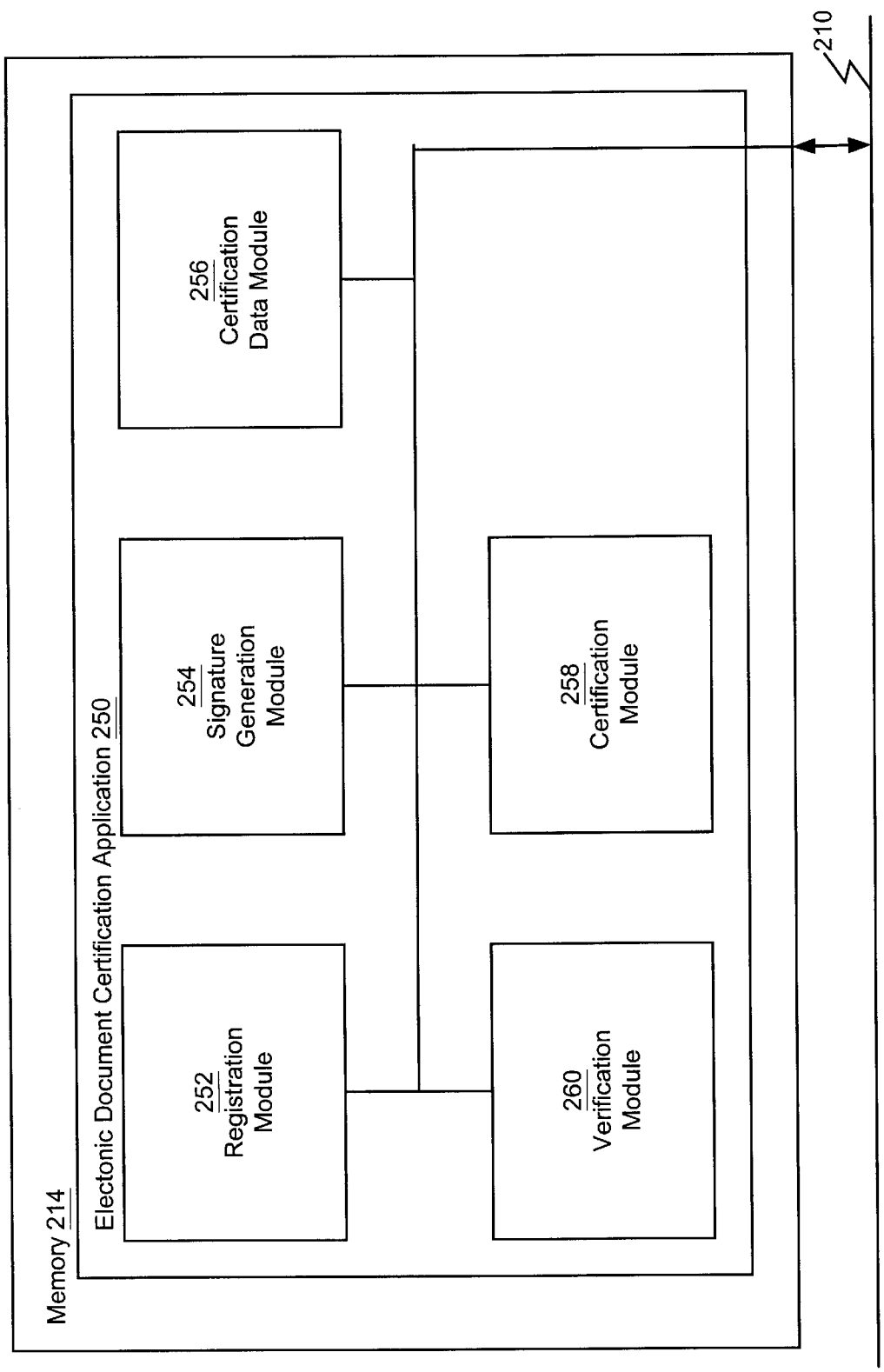
FIG. 2B is a block diagram illustrating an embodiment of a memory including a certification application in accordance with the present invention.
Figure 3:
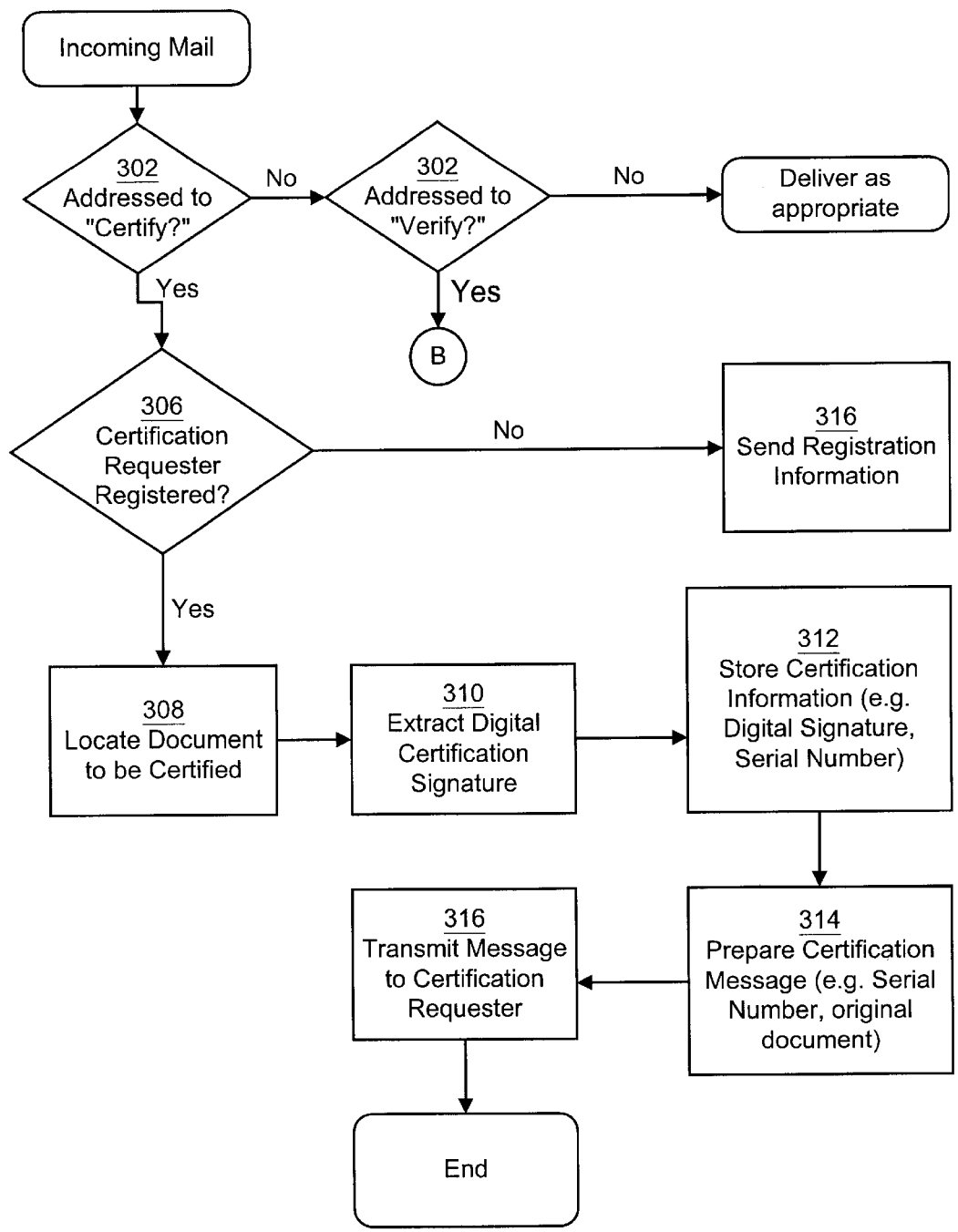
FIG. 3 is a flow chart illustrating an embodiment of electronic document certification in accordance with the present invention.

Referring now to the block diagram of FIG. 2B, an embodiment of the document certification application 250 in accordance with the present invention comprises a registration module 252, a signature generation module 254, a certification data module 256, a certification module 258 and a verification module. The various modules 252, 254, 256, 258, 260 are in communication with each other and with the certification provider 200 modules described in connection with FIG. 2A. Preferably, the electronic document certification application 250 is provided as software, although it can be provided as hardware, firmware, or combinations thereof.

The operation of the various modules and the method of certification is now described with reference to FIG. 2B along with the flow chart of FIG. 3, which illustrates an embodiment of electronic document certification according to the present invention.

A party may request certification (a "certification requester") using their computer (such as client 100) or other electronic device that can then transmit the document over the Internet or other communication medium. Certification can be requested for electronic documents that include, among other things, text, graphics, sound, music, sketches, and video clips. The document may also be encrypted, if the certification requester wishes to keep its contents protected.

Preferably, certification requests are made using electronic mail. In this embodiment, the request is an electronic mail directed to an address corresponding to the certification procedure. For the purposes of this description, this address can be referred to as "certify@timestamp.com", and the electronic mail message includes the document to be certified. As described previously, the certification provider 200 is configured to receive messages using SMTP. In step 302, the electronic document certification application determines whether the request is addressed to "certify" and, if so, the message is provided to the certification module 258. If the message is not addressed to "certify", it is determined (step 304) whether the message is addressed to "verify" or other addresses included in the certification service, and the message is appropriately forwarded. Conventional protocols are used to appropriately route requests.

A registration determination (step 306) can be made before proceeding with document certification. The certification module 258 checks the requester's identity and compares it to information provided in the registration module 252 to determine whether the requester is registered. The requester identity is obtained from their email address, and is compared to a database of valid registered addresses provided, for example, in the registration module 252. In some circumstances the sender will not be registered, yet the domain or site that the sender's document is originating from may be a registered domain or site and that would suffice for billing and identification purposes. Again, the task of sender verification involves a standard database lookup procedure. If the requester is not registered, then they can be sent (step 316) an email with information on how they can properly register.

To register, a person can use a variety of means, such as providing a notarized document that is delivered by mail (not electronic) that confirms the individual's identity. An email address is also requested so that acknowledgments and confirmations can be sent to that email address. That way if mail is being sent from another source but it is spoofed to make it seem it was coming from a registered user, that registered user will get acknowledgments, which will signal non-requested certification and thus the fraudulent usage. There can also be an option to verify identities by requiring encrypted passwords in the electronic email messages. Additionally, encryption algorithms (e.g., PGP or RSA) can be used to provide registration information that can be correlated with the certification requester. Encryption algorithms can also be used to ensure that a document is not modified en-route to the certification provider 200 from the requester.

It is understood that registration is optional, but if registration is used, once registration is confirmed, the document to be certified can be located (step 308) for processing by the certification module 258. In this embodiment, the contents of an electronic mail message are treated as the document to be certified. Any portions of the message that will not be certified, if any, can be removed. Thus, the certification module 258 strips the local mail headers from the message, leaving only the original headers and the contents of the message, as well as the source and destination. The date of message transmittal (such as is provided by an electronic mail sender's electronic mail program) can be ignored, as it is not typically reliable and since the certification provider 200 can implement more accurate time and date information.

Again, in this embodiment, the contents of the message are treated as the document to be certified. Thus, the contents of the message are provided to the signature generation module 254 as the document. The signature generation module 254 extracts a signature (step 310) from the document that is unique to the document. Preferably, the signature is a distillation of the contents of the document. This allows compact storage. However, the signature should be extensive enough to distinguish even those documents that are very similar, thus acting as a digital fingerprint for the document.

Preferably, a checksum of the document is taken to produce the document signature, such as the conventional message digest 5 checksum (MD5) and accompanying algorithm. In the MD5 checksum, any message or document having arbitrary length can be input, and a 128-bit digital signature that operates as a digital fingerprint for the document is produced as output. Preferably, the checksum is collision proof, meaning that it is not feasible to produce the same checksum from two documents or messages. The checksum can also be made tamper proof if desired. Tamper proof checksums typically use keys and encryption, and prevent attackers from modifying the message stream. Since the checksum will typically be stored and maintained by the certification provider, and not transmitted back to the requester, provision of a tamper proof check sum is not absolutely necessary. However, where a tamper proof checksum algorithm is desired, MD5 with DES encryption can be used (MD5-DES).

Again, conventional programming techniques can be used to implement any conventional checksum, but the MD5 can implement the following steps. The document (such as the electronic mail message) comprises a number of bits "b", First, the document is padded so that its length in bits is 64 bits less than a multiple of 512 bits long. Padding requirements are predetermined to provide consistent application of the checksum algorithm. Then, a 64-bit representation "n" of the number of bits "b" in the original document (typically the exponent in a base 2 representation of the number of bits) is appended to the padded result. Since "n" has 64 bits, the padded, appended document is a multiple of 512 (and thus 16 and 32). Then, the padded, appended document is processed using a four-word buffer (A,B,C,D) to compute the message digest. Each of buffers A, B, C, and D is 32 bits. The MD5 algorithm provides initial values and predetermined rules for updating the buffers. These initial values and predetermined rules are part of the MD5 standard and are conventional. Using the same initial values and predetermined rules produces the same results for a document whenever it is processed. Each 16 bit block of the padded, appended document is processed according to the rules to produce the message digest (4×32=128 bits), which is the checksum.

Other checksums can also be used. For example, a simple routine that adds the values of each octet of data in the document, similar to the way ethernet packets are checksummed, could be used by the signature generation module 254, but the MD5 is preferred because it is more collision proof.

The signature generation module 254 is preferably a plug-in feature. This allows different schemes (such as different checksum schemes) to be used according to the expected type of document to be certified. The MD5 signature will typically be 128 bits, but the length can vary depending on the signature generation module 254 used. It is understood that in alternative embodiments the digital signature does not have to be a checksum. Any algorithm that produces a unique digital signature corresponding to the content of the processed document (preferably the entire contents, whereby a minor change to any document portion will change the signature). The signature generation module 254 is preferably arranged, using conventional techniques, to prevent hackers or others from determining the actual signature generation process (such as the actual checksum method being used, or at least the keys used in conjunction with a tamper proof arrangement) so that the integrity of the system is maintained.

The following example further illustrates the operation of the signature generation module 254. The longer the number of bytes that the document is compiled into, the less likely that two documents, however similar, will match. In fact, with many checksum methods, not only would two documents with only a one character difference not match, neither would two documents with the same exact characters, in different order.

For example:

Documents containing: "Hello World." and "Hello World!" will not match.

Documents containing: "Hello World!" and "World Hello!" will not match.

The certification module 258 is in communication with the signature generation module 254 and thus obtains the extracted signature for storage as certification information (step 312) in the certification data module 256, which preferably implements a conventional database. In addition to the digital certification signature, the certification information, initially stored in the module 256, includes an identification code (such as a serial number). The identification code is used to index document certification. The identification code can be sent to the certification requester upon completion of certification.

In this embodiment, a typical database entry in the certification data module 256 (the certification information) will include:

The digital certification signature for the certified document (e.g., the 128 bit MD5 check sum of the transmitted message);

The time and date of certification (any resource can be used, but preferably, the system uses an accurate clock 222 that can be synchronized with an atomic clock with conventional software);

The sender of the message;

The recipient of the message (particularly for certified electronic mail); and

The identification code (preferably a serial number unique to each entry in the database).

By inclusion of the exact date and time along with the digital certification signature, the certification provides and thus can be referred to as a "timestamp", since subsequent authentication and verification of not only the document, but of when it was known or possessed by a party, can be provided. Additionally, particularly where the document is an electronic mail message, maintaining a record of the recipient allows for certified electronic mail. Since the digital certification signature is also maintained, a party could later verify that the recipient was sent (and, in some instances, received) the message along with proof of the content of the message.

Again, the certification data module 256 can provide a standard database file with entries. Preferably, the database is named according to the date, so each day a new database is used for this purpose. This keeps the size of the database files small and easy to handle. After a database is used, it can be stored local to the certification provider 200 (such as in a local hard disk or other data storage device 216) or remotely. Additionally, the certification module 258 can use the local data storage device 216 or any storage during the certification process (i.e. the database does not have to completely reside in memory). The database could be just one file with many entries, and it could be shared by many machines, if multiple servers 200 are certifying documents (sharing the load).

The certification module then prepares (step 314) a message that can be transmitted (step 316) to the certification requester. In this embodiment, the identification code (e.g., the serial number) can be placed in a new electronic mail message (which can be referred to as the timestamp certificate) addressed to a relevant party such as the certification requester. The exact time of certification is also noted for the sender's use. The original contents of the document will be appended to the new message, with a warning to the user to keep the new message for future use, and not to make any modification.

For example, if the original message includes:

Date: July 3, 1996
Subject: Predictions
From: Grandazul@aol.com
To: certify@timestamp.com I predict the following will occur before the year 2000:

The Mets will win the World Series.
Dan Marino will win a Super Bowl.
Al Gore will run for president.
Then the returned message, or timestamp certificate, can look something like this:
From: admin@timestamp.com
To: Grandazul@aol.com
Subject: Timestamp Certificate SAVE THIS MESSAGE. This is your timestamp certificate. Do NOT modify!
Your document has been timestamped at 11 :06:45(GMT) on July 3, 1996.
Timestamp Serial Number: 961023-0-02012
Message was sent by: Grandazul@aol.com
Message was sent to: certify@timestamp.com.

The contents of the message are enclosed. DO NOT MODIFY THE CONTENTS OF THIS MESSAGE.

Save this complete document for future use. TIMESTAMP.COM does not store a copy of your message, nor can we reconstruct or recreate it for you, if you lose it, or modify it.

In order to verify the timestamp in this message, please send this message, in its entirety to verify@timestamp.com, and you will be sent back the results of verification. The smallest change to this document will void the timestamp serial number.

*=*=*=*=*=*timestamp.com DOCUMENT START*= *=*=*=*=*=*=*
Date: July 3, 1996
Subject: Predictions
From: Grandazul@aol.com
To: certify@timestamp.com
I predict the following will occur before the year 2000:

The Mets will win the World Series.
Dan Marino will win a Super Bowl.
Al Gore will run for president. *=*=*=*=*= *timestamp.com DOCUMENT END*=*=*=*=*=*= *=*

In this embodiment, the text between the document start and stop correspond exactly the text of the document. Although the results of signature extraction are content driven, the electronic document certification application 250 extracts a signature independent from the content of the certified document. Thus, an encrypted document can and would be certified the same way that an un-encrypted one would. When the document is provided back to the certification requester such as in this embodiment, the document format is preserved, and no additions are made.

Once the timestamp certificate is compiled, it is transmitted (step 316) to the relevant party, such as the party requesting certification. In this embodiment, it is provided in the form of an electronic mail message. If the message is found to be undeliverable, another attempt to transmit the message can be made, and, if that fails, then the mail can be sent to a technician who can contact the party by other means.

The above example construes an entire message that is transmitted by electronic mail as the "document." Thus, the digital signature (maintained at the certification provider 200) is extracted from the entire message (less some header stripping). Additionally, it includes the entire message in the timestamp certificate. This can be advantageous because it allows a concise record of the certified document, and the identification code (here the serial number) is less likely to get lost. With this embodiment, if a standard electronic mail message with an identical text in the body of the message were sent for certification at two different times, and the time was included in the message, different signatures would be generated for each of the two certification requests.

In alternative embodiments, the "document" to be certified is not the entire message. Conventional techniques can be used to segregate, for example, a message "attachment" from an electronic mail message (such as conventional protocols used by electronic mail packages using vendor provided commands), and the attachment can be the "document" from which a signature is extracted for certification. In that case, the identical attachments would produce identical digital signature extractions.

An additional alternative is that the certified document does not have to be included in the message transmitted back to the requester. The identification code could merely be provided. This would put more of a record keeping burden on the certification requester, because they would have to remember which document the identification code belonged to, and, later, a positive verification will only be returned for a document exactly like the certified document.

The certification module 258 also includes routines for the provision of certified electronic mail. Although the interaction described above is between the requester and the certification provider 200, for certified electronic mail the original message would also be forwarded to a recipient.

Figure 5:
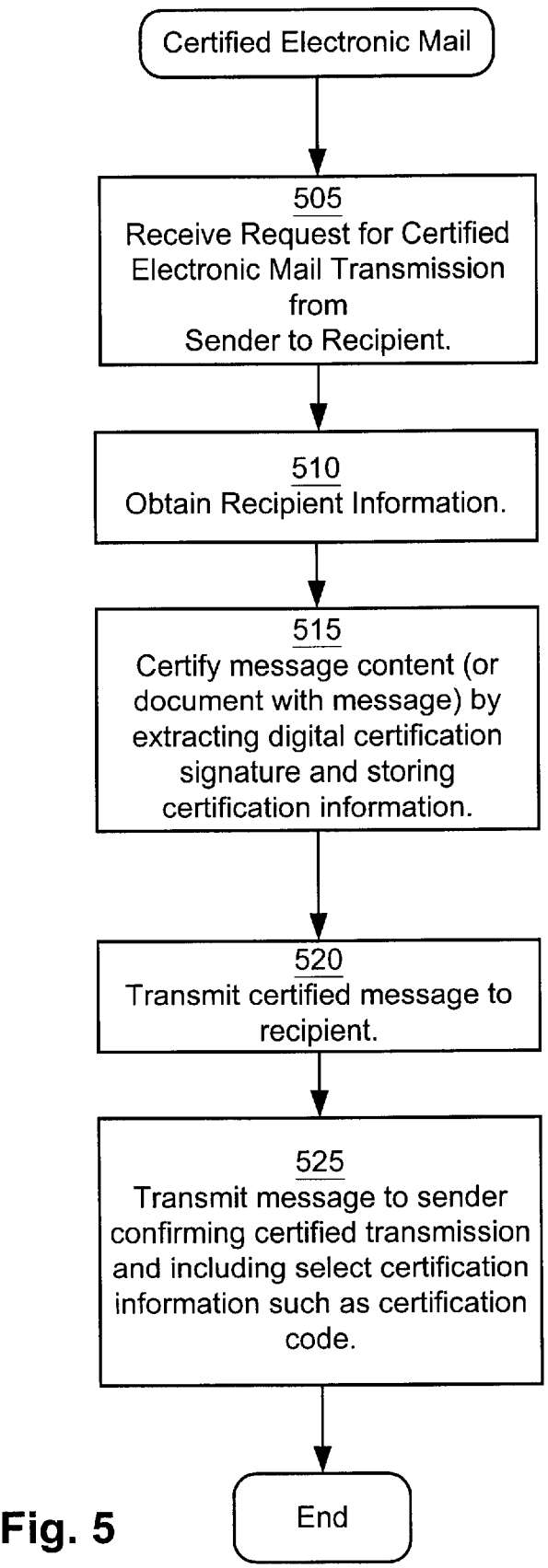
FIG. 5 is a flow chart illustrating an embodiment of certified electronic mail transmission in accordance with the present invention.

Referring now to the flow chart of FIG. 5 along with FIG. 2B, in a first step 505, a request for certified electronic mail transmission from a sender (the certification requester) to a recipient is received by the certification provider 200. In this instance, the message to be sent by certified electronic mail is received by the certification provider 200, possibly to an alternative address (i.e., other than the "certify" address). Alternatively, the message could be sent to the "certify" address, but would include information about the recipient within the body of the message addressed to certify. Either alternative allows the certification module 258 to obtain the message recipient information. Preferably, the message would include, in the text portion, a recognizable string indicating the recipient. For example, the message could include the note "CERTIFIED ELECTRONIC MAIL, RECIPIENT=name@service.com." The message is received and scanned by the certification module 258 using conventional text parsing techniques to determine whether the message is a piece of certified electronic mail, and then to locate and isolate the recipient information. Preferably, the module 258 includes routines for providing a lexical stream scan for the capitalized portion of the above note (CERTIFIED ELECTRONIC MAIL, RECIPIENT=). Once the capitalized portion of the note is recognized within the message, the module 258 can use conventional routines to locate the recipient information (typically following the identifying note). The application 250 then certifies (in step 515) the document portion of the message (e.g., the message itself could be the document, or an attachment could be the document) as described for certification above (i.e., certification module 258 locates and obtains document; signature generation module 254 extracts digital certification signature; certification data module 256 stores certification information including time and date, digital certification signature, and serial number). Two electronic mail messages are then sent (steps 520, 525), one to the recipient of the electronic mail message, and one to the sender. The recipient receives the message with a warning indicating that the message had been sent by certified electronic mail. The sender would receive a message similar to the described timestamp certificate. That message could indicate that the mail certification process was successful, that the transmission was delivered to recipient (e.g., name@service.com), and could include a copy of the original message and an associated serial number for subsequent verification procedures.

Measures can also be taken to ensure that the message was transmitted to (and possibly received by) the recipient prior to sending a confirmation to the certification requester (the electronic mail sender). This could be an active indication such as a "return receipt" triggered by receipt of the electronic mail by the recipient. Active indication could also be performed by requiring the recipient to take steps to obtain a message. This could be done by requesting the recipient, in a first electronic mail message, to go to an FTP or Web site and actually request the certified electronic mail message, whereupon the message can be provided to the recipient. The initial handshaking between the recipient and the site can provide further proof that, not only was the certified electronic mail transmitted to the recipient, but the recipient actively requested its transmission after successful receipt of the first electronic mail message which would have been delivered to the same address. A passive indication of transmission success could also be used, such as determining that delivery was successful after a predetermined lapse of time where the message is not indicated to be non-deliverable.

Sometime after document certification, a party may need to prove that they had possession of a document at a certain date or that they had transmitted a particular document to a recipient using electronic mail. This possession would imply that they created the document on or before that date. In order to prove this, they can provide evidence of certification, such as the timestamp certificate. This evidence can be provided to a challenging party, an independent person, a judge, etc. Verification procedures can then be used to authenticate the document. For example, by sending the "timestamp certificate" to a "verify" address at the certification provider 200, a response will be mailed back with the status of the certificate.

Figure 4:
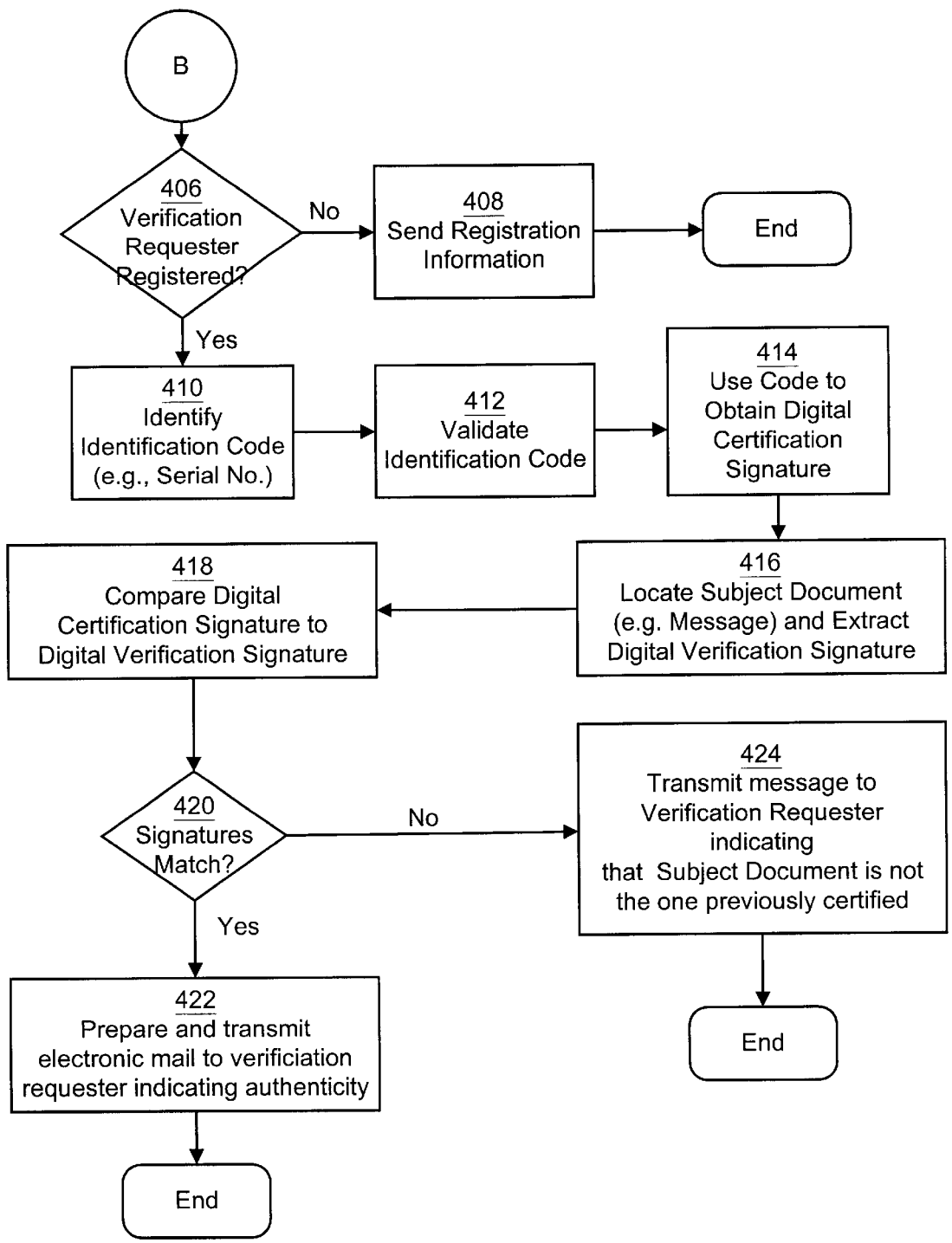
FIG. 4 is a flow chart illustrating an embodiment of electronic document certification verification in accordance with the present invention.

Referring now to the flow chart of FIG. 4 alone with FIG. 2B, incoming mail is received by the certification provider 200 as described regarding certification. As with certification, it is determined whether the incoming mail is addressed for certification or verification. When verification is sought, it can be initially determined whether the requester is registered (step 406). Registration would be the same as is described for the certification procedure, including the transmission of negative results to the verification requester (step 408).

Basically, to verify certification, the same digital signature extraction process is applied to the same document for which certification was originally sought. Because the signature extraction process provides a digital signature unique to each document, if there are any differences between the certified document and the document for which verification is sought, then the verification will come up negative. On the other hand, if the documents are exactly the same, their digital signature and thus verification will come out positive.

Continuing with the example provided for certification, it is assumed that the content of an electronic mail message has been certified, and that the time and date of the certification, a serial number and the certified document (referred to as the timestamp certificate) had been transmitted to the certification requester. Thus, verification is sought by returning the "timestamp certificate" to the "verify" address. That document (ostensibly or allegedly) includes the copy of the original message, along with an identification code in the form of a serial number.

The verification module 260 includes routines for segregating the document to be verified from the serial number. In this embodiment, timestamp certification is sent to a "verify" address as an electronic mail message (e.g., "verify@timestamp.com"). After stripping away superfluous header information as in the certification process, the serial number is located from within the message (step 410). This is done using conventional techniques, for example by scanning the message for the introductory language ("Timestamp Serial Number:") and then obtaining the serial number that is associated with it.

The verification module 260 determines initially whether the serial number is valid (step 412). A listing of possible serial numbers and/or formats can be consulted by the verification module 260 for such validation. If the serial number is valid, then the appropriate database file is accessed to obtain the digital certification signature and any other necessary information (step 414). If multiple signature extraction processes (e.g., different checksum protocols) are used, then the extraction process is also identified so that it can be reproduced. The digital certification signature stored in the database file is also obtained for comparison purposes. The information is provided either local to the certification provider 200 (such as in the certification data module 256, or a hard disk), or elsewhere, as described for certification.

In this embodiment, the document subject to verification is located from between the following lines in the message:

*=*=*=*=*=*timestamp.com DOCUMENT START*=*=*=*=*=*=*

*=*=*=*=*=*timestamp.com DOCUMENT END*=*=*=*=*=*=*

Conventional programming techniques, such as those incorporating a scan for the above string for the header and footer, are used to locate the subject document. First, the message is scanned for the header (the string including "DOCUMENT START", after the header is found, the text following it is loaded into a buffer in memory, until the footer is found (the string including "DOCUMENT END"). If necessary, any footer can be removed from the buffer. The verification module 260 accesses the document and operates in conjunction with the signature generation module 254 to apply the same signature extraction process that was provided at certification to the document (step 416). Where different signature extraction processes are provided, the module 254 can be appropriately configured according to the maintained information about the particular process.

If the document is the same as the one that was certified, the same digital signature should result. Thus, the verification module 260 compares (step 418) the signature extracted from the subject document (for which verification is sought) to the signature extracted from the document when certification was provided. If the digital verification signature (step 420) matches the certification signature, then document certification is verified and an appropriate message can be sent to the verification requester or other relevant party (step 422). If there is not a match, then an alternative appropriate message is sent (step 424). Depending on whether a match is made, one of the following two messages can be produced:

For successful verification,

From: admin@timestamp.com

To: Grandazul@aol.com

Subject: Verification of Timestamp Certificate

This is to verify the document with Timestamp Serial Number: 961023-0-02012

This document in its entirety was received originally at 11:06:45(GMT) on July 3, 96.

At that time, the message was sent by: Grandazul@aol.com and was sent to: certify@timestamp.com.

or, for unsuccessful verification,

From: admin@timestamp.com

To: Grandazul@aol.com

Subject: Verification of Timestamp Certificate

The document with Timestamp Serial Number: 961023-0-02012 does not match the original document that was timestamped. This could be due to changes in the document (such as a change in the case of text or the movement of words from one paragraph to another) or an incorrect Timestamp Serial Number. If you believe that this message is incorrect, please ensure that you are sending an original unmodified timestamp certificate as sent to you. If you need assistance, please contact help@timestamp.com.

If a valid Timestamp Serial Number (identification code) was not provided, the following message can be returned:

From: admin@timestamp.com

To: Grandazul@aol.com

Subject: Verification of Timestamp Certificate

Timestamp Serial Number: 96XXX3-0-02012 is not a valid serial number.

If you believe that this message is incorrect, please ensure that you are sending an original umnodified timestamp certificate as sent to you. If you need assistance, please contact help@timestamp.com.

As with certification, in alternative embodiments, the document and the serial number can be separately maintained by the party requesting verification. In such embodiments, the electronic mail requesting verification could include the serial number and, as an attachment, the document to be verified.

There are various application for electronic document certification. A non-exhaustive list of suggestions follows. A scientist draws up a draft of a patent. Before showing this patent to any potential investors, she can submit an electronic document including her work for certification. She is then provided with an identification code (possibly including a copy of the document and time and date information). If this scientist ever wished to prove when she had created her artwork, she can use the identification code and a copy of the document to authenticate the document and to prove when she had possession. A screenwriter has an idea regarding a new motion picture. He is uneasy about approaching motion picture companies with the idea before protecting himself. Therefore he will send an electronic mail enclosing his screenplay for certification. Similarly, a harassed employee can submit a written account of an event by electronic mail for certification; a musician recording a score on a computer can submit the document for certification.

Although the present invention has been described with reference to certain preferred embodiments, those skilled in the art will recognize that various modifications may be provided. For example; although separate modules for registration, signature generation, verification and certification are described, it is understood that the various processes may be integrated into common modules or subdivided into additional modules which perform equivalent functions. Additionally, although electronic mail is described in an embodiment, it is understood that other network protocols could be used to transmit information to and from the certification server for both certification and verification. Additionally, direct provision of documents, such as through a floppy disk, can also be provided. These and other variations upon and modifications to the described embodiments are provided for by the present invention which is limited only by the following claims.

What is claimed is:

1. A method for electronically certifying, verifying, and forwarding electronic documents, the method comprising the steps of:

receiving a request to process an electronic document from a requester;

determining from the request to process whether the request to process is a request type certification, a request type verification, or a request type forwarding;

extracting from the request to process a digital certification signature that is unique to the electronic document in response to determining that the request to process is a request type certification;

creating a certification identifier that is associated with the digital certification signature;

permanently maintaining information about the electronic document in a database for later verification, the information including the digital certification signature, the time and date of receipt of the request and an association between the certification identifier and the digital certification signature; and transmitting the certification identifier to the requester.

2. The method of claim 1, further comprising:

determining whether the requester is registered prior to proceeding with document processing.

3. The method of claim 2, wherein determining whether the requester is registered is performed using a Public Key Infrastructure.

4. The method of claim 1, further comprising:

transmitting a time and date of document certification to the requester with the certification identifier.

5. The method of claim 1, wherein the request to process is received via simple mail transfer protocol as an electronic mail message with the electronic document as an attachment.

6. The method of claim I, wherein the request to process and the electronic document are received via a website.

7. The method of claim 1, wherein receiving a request to process includes receiving a request that has been generated by a Java™ applet.

8. The method of claim 1, wherein the digital certification signature is extracted by a Java script.

9. The method of claim 1, wherein the digital certification signature is extracted from the request to process by producing a message digest 5 checksum of the electronic document.

10. A method for electronically certifying, verifying, and forwarding electronic documents, the method comprising the steps of:

receiving a request to process an electronic document from a requester;

determining from the request to process whether the request to process is a request type certification, a request type verification, or a request type forwarding;

extracting from the request to process a received certification identifier that is associated with the electronic document being verified in response to determining that the request to process is a request type verification;

extracting from the electronic document a first certification digital signature that is unique to the electronic document being verified;

locating in a database of permanently maintained information about previously certified electronic documents a second certification digital signature associated with the received certification identifier;

comparing the first certification digital signature with the second certification digital signature; and transmitting a comparison report to the requester.

11. A method for electronically certifying, verifying, and forwarding electronic documents, the method comprising the steps of:

receiving a request to process an electronic document from a requester;

determining from the request to process whether the request to process is a request type certification, a request type verification, or a request type forwarding;

extracting from the request to process a recipient address in response to determining that the request to process is a request type forwarding;

extracting from the electronic document a digital certification signature unique to the electronic document;

creating a certification identifier that is associated with the digital certification signature;

permanently maintaining information about the electronic document in a database for later verification, the information including the digital certification signature, the time and date of receipt of the request to forward, and an association between the certification identifier and the digital certification signature;

transmitting the certification identifier to the requester; and transmitting the electronic document, the certification identifier, and a certified mail notice to the recipient address.

12. The method of claim 11, wherein the request to process is received via simple mail transfer protocol as an electronic mail message with the electronic document as an attachment.

13. The method of claim 12, further comprising:

receiving the electronic mail message at a certification address;

searching the electronic mail message to locate the recipient address; and in response to locating the recipient address, transmitting the electronic mail message with the electronic document to the recipient address, and sending a confirmation message including the forwarding identifier to the requester.

14. A computer system for processing certification requests, verification requests and forwarding requests for electronic documents, the computer system comprising:

a central processing unit for making registration determinations, certification determinations, verification determinations and forwarding determinations;

a communication module to establish a network connection and receiving data from clients, the communication module communicatively coupled to the central processing unit for communicating with the clients;

a certification module for processing the certification requests, the certification module communicatively coupled to the central processing unit for receiving signals in response to the central processing unit making the certification determinations, and the certification module further communicatively coupled to the communication module for communicating with the clients;

a verification module for processing the verification requests, the verification module communicatively coupled to the central processing unit for receiving signals in response to the central processing unit making the verification determinations, and the verification module further communicatively coupled to the communication module for communicating with the clients;

a signature generation module to generate unique signatures for the electronic documents, the signature generation module communicatively coupled to the certification module to provide the unique signatures for the electronic documents in response to the communication module receiving the certification requests; and a certification data module to maintain database records for permanently storing information about the electronic documents, the information including the unique signatures for the electronic documents, and receiving time and date of the requests, the certification data module communicatively coupled to the certification module for receiving the unique signatures for the electronic documents, further communicatively coupled to the central processing unit for obtaining the time and date of the certification requests and the forwarding requests, and the certification data module further communicatively coupled to the verification module for providing the information about the electronic documents in response to the verification requests.

15. The apparatus of claim 14, further comprising:

a registration module for generating and verifying clients' registration information, the registration module communicatively coupled to the central processing unit, the central processing unit signaling the certification module upon making the registration determinations, and the registration module further communicatively coupled to the communication module for communicating with the clients.

16. The apparatus of claim 14, wherein the certification module further includes routines for receiving an electronic mail message at a certification address; scanning the electronic mail message to locate a recipient address; sending the electronic mail message with the electronic document to the recipient address; and sending a confirmation message including the certification identifier to the clients.

17. An apparatus for electronically certifying, verifying, and forwarding electronic documents, the apparatus comprising:

means for receiving a request to process an electronic document from a requester;

means for determining from the request to process whether the request to process is a request type certification, a request type verification, or a request type forwarding;

means for extracting from the request to process a digital certification signature that is unique to the electronic document in response to determining that the request to process is a request type certification;

means for creating a certification identifier that is associated with the digital certification signature;

means for permanently maintaining information about the electronic document in a database for later verification, the information including the digital certification signature, the time and date of receipt of the request and an association between the certification identifier and the digital certification signature; and means for transmitting the certification identifier to the requester.

18. The apparatus of claim 17, further comprising:

means for determining whether the requester is registered prior to proceeding with document processing.

19. The apparatus of claim 17 further comprising:

means for extracting from the request to process a recipient address in response to determining that the request to process is a request type forwarding; and means for transmitting the electronic document, the certification identifier, and a certified mail notice to the recipient address.

20. An apparatus for electronically certifying, verifying, and forwarding electronic documents, the apparatus comprising:

means for receiving a request to process an electronic document from a requester;

means for determining from the request to process whether the request to process is a request type certification, a request type verification, or a request type forwarding;

means for extracting from the request to process a received certification identifier that is associated with the electronic document being verified in response to determining that the request to process is a request type verification;

means for extracting from the electronic document a first certification digital signature that is unique to the electronic document being verified;

means for locating in a database of permanently maintained information about previously certified electronic documents a second certification digital signature associated with the received certification identifier;

means for comparing the first certification digital signature with the second certification digital signature; and means for transmitting a comparison report to the requester.

* * * * *

UNITED STATES PATENT AND TRADEMARK OFFICE
CERTIFICATE OF CORRECTION

PATENT NO. : 6,327,656 B2
DATED : December 4, 2001
INVENTOR(S) : Mahboud Zabetian It is certified that error appears in the above-identified patent and that said Letters Patent is hereby corrected as shown below:

<u>Title page,</u>
Item [60], under Related U.S. Application Data please insert:
-- Provisional Application No. 60/021,223, filed on July 3, 1996 --

Signed and Sealed this

Twentieth Day of August, 2002

*Attest:*

*Attesting Officer*

JAMES E. ROGAN
*Director of the United States Patent and Trademark Office*